US008712657B2

(12) United States Patent
Khatchikian et al.

(10) Patent No.: US 8,712,657 B2
(45) Date of Patent: Apr. 29, 2014

(54) METHOD AND DEVICE FOR OPERATING A VEHICLE HAVING A HYBRID DRIVE

(75) Inventors: Peter Khatchikian, Schwieberdingen (DE); Manfred Hellmann, Hardthof (DE); Felix Reber, Ludwigsburg (DE); Mykhaylo Klymenko, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 570 days.

(21) Appl. No.: 13/000,837

(22) PCT Filed: Mar. 24, 2009

(86) PCT No.: PCT/EP2009/053436
§ 371 (c)(1),
(2), (4) Date: Apr. 5, 2011

(87) PCT Pub. No.: WO2009/156192
PCT Pub. Date: Dec. 30, 2009

(65) Prior Publication Data
US 2011/0180337 A1    Jul. 28, 2011

(30) Foreign Application Priority Data
Jun. 26, 2008   (DE) .......................... 10 2008 002 691

(51) Int. Cl.
*B60W 20/00* (2006.01)
*F16H 61/12* (2010.01)

(52) U.S. Cl.
CPC ................ *B60W 20/50* (2013.01); *F16H 61/12* (2013.01)
USPC ........................................ 701/62; 180/65.265

(58) Field of Classification Search
CPC ................................. F16H 61/12; B60W 20/50
USPC ......... 180/65.25, 65.265, 65.275; 701/51, 62, 701/67
See application file for complete search history.

(56) References Cited

U.S. PATENT DOCUMENTS

| 4,838,125 | A  | * | 6/1989  | Hamano et al. ................ 477/129 |
| 5,873,426 | A  | * | 2/1999  | Tabata et al. .................. 180/65.7 |
| 6,007,443 | A  | * | 12/1999 | Onimaru et al. ................... 475/5 |
| 6,053,842 | A  | * | 4/2000  | Kitada et al. ........................ 477/5 |
| 6,083,138 | A  | * | 7/2000  | Aoyama et al. ..................... 477/5 |
| 6,625,534 | B2 | * | 9/2003  | Suzuki et al. .................... 701/62 |
| 8,160,791 | B2 | * | 4/2012  | Reber .............................. 701/62 |

(Continued)

FOREIGN PATENT DOCUMENTS

EP     1 177 931     2/2002

*Primary Examiner* — Hau Phan
*Assistant Examiner* — Jacob Meyer
(74) *Attorney, Agent, or Firm* — Kenyon & Kenyon LLP

(57) ABSTRACT

A method and a device for operating a vehicle having a hybrid drive are described, in which a first drive unit and a second drive unit contribute jointly or individually to the drive of the vehicle, the first drive unit driving the second drive unit in the manner of a generator for charging an energy storage device, the first drive unit and the second drive unit being separable by a drive train element transferring a torque of the first drive unit. In a method in which it is ensured that the vehicle may continue to drive safely even in the event of a defect in a drive train element between the first drive unit and the second drive unit, the torque portion used for charging the energy storage device is reduced to a minimum torque, while the torque excess, which is reduced in the event of a defect in the drive train element but still exceeds the minimum torque, is utilized to propel the vehicle.

8 Claims, 2 Drawing Sheets

(56) References Cited

U.S. PATENT DOCUMENTS

| | | | |
|---|---|---|---|
| 8,352,135 B2* | 1/2013 | Lang et al. | 701/54 |
| 8,423,230 B2* | 4/2013 | Steinhauser et al. | 701/29.2 |
| 2002/0016660 A1* | 2/2002 | Suzuki et al. | 701/62 |
| 2007/0216312 A1* | 9/2007 | Ogata et al. | 315/131 |
| 2007/0219045 A1* | 9/2007 | Ogata et al. | 477/3 |
| 2009/0082150 A1* | 3/2009 | Wu et al. | 475/5 |
| 2009/0112426 A1* | 4/2009 | Reber | 701/62 |
| 2011/0118079 A1* | 5/2011 | Mueller et al. | 477/5 |
| 2011/0202215 A1* | 8/2011 | Falkenstein et al. | 701/22 |
| 2012/0109430 A1* | 5/2012 | Rollmann et al. | 701/22 |

* cited by examiner

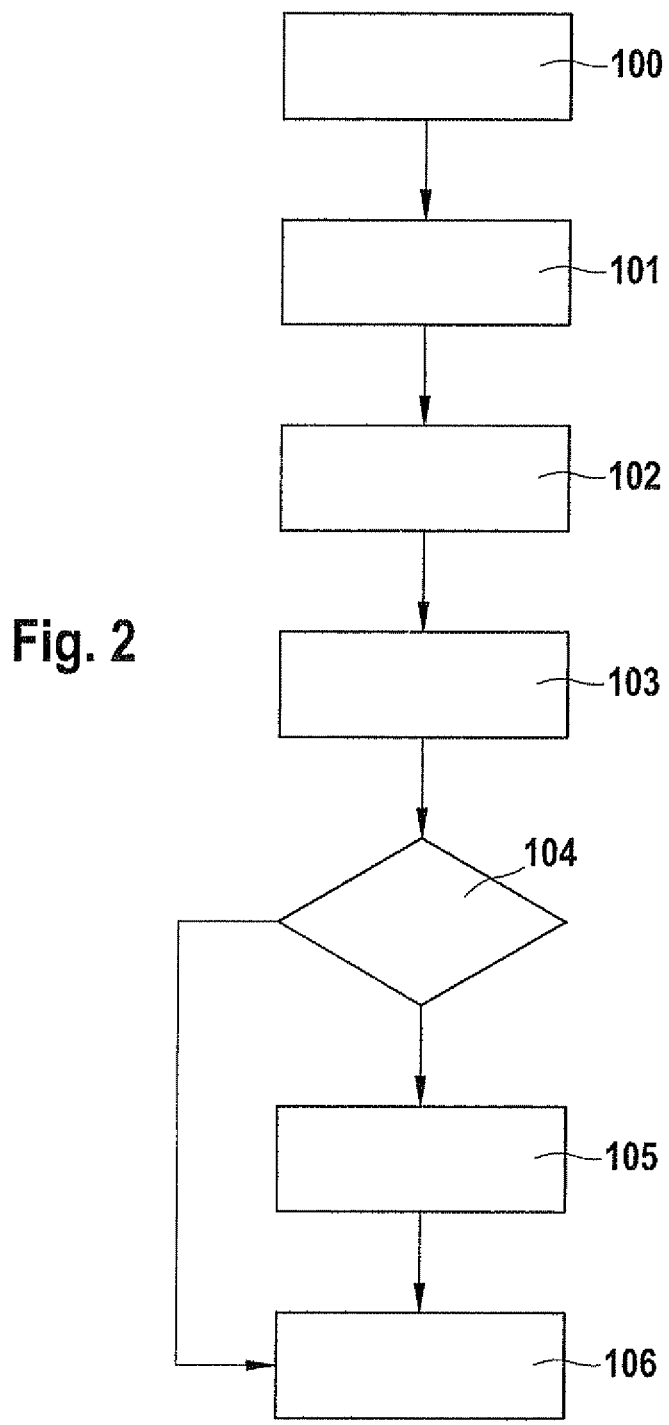

METHOD AND DEVICE FOR OPERATING A VEHICLE HAVING A HYBRID DRIVE

FIELD OF THE INVENTION

The present invention relates to a method for operating a vehicle having a hybrid drive, in which a first drive unit and a second drive unit contribute jointly or individually to the drive of the vehicle, the first drive unit driving the second drive unit in the manner of a generator for charging an energy storage device, and the first and second drive units are separable by a drive train element transferring a torque of the first drive unit, as well as a device for performing the method.

BACKGROUND INFORMATION

Vehicles having hybrid drives are being developed to an increasing extent; in these vehicles, various drives are used for a drive task. The individual motors in the hybrid drive may cooperate in different ways. Either they act simultaneously or only one drive unit acts on the vehicle to be moved.

With so-called parallel hybrids, an electrical drive is positioned on the shaft of an internal combustion engine. To ensure strictly electrical operation with the internal combustion engine at standstill, the electrical drive is decoupled from the internal combustion engine by a separating clutch. In the event of defects in the separating clutch or in the hydraulic triggering of the separating clutch, the transferrable torque may be much lower than the maximum torque usually available. The torque of the internal combustion engine is used not only for the vehicle drive but also for generator operation of the electric motor, which charges an energy storage device.

In the event of a defect in the separating clutch, the energy storage device is charged further in the usual manner, which may result in torque no longer being available to propel the vehicle. This means that the vehicle is no longer able to move in this case.

It is believed to be understood that in the case of a vehicle having a hybrid drive, the distance the hybrid vehicle is still able to travel is determined after it has been discovered that one drive unit of the hybrid drive is no longer available and it will be necessary to continue driving with the remaining drive unit, which is still functional.

SUMMARY OF THE INVENTION

An advantage of the exemplary embodiments and/or exemplary methods of the present invention is that the vehicle is still able to continue to move even in the event of a defect in the separating clutch, because the torque portion used for charging the energy storage device is reduced to a minimum torque, while the excess torque of the torque, which is reduced in the event of a defect in the drive train element but still exceeds the minimum torque, is utilized to propel the vehicle.

The driver thus has the option of moving the vehicle for a certain distance in the event of a defect in the separating clutch which restricts the transferrable torque, This allows the driver, for example, to leave a possible danger area or to seek out a nearby repair shop.

To still have a torque portion available for propelling the vehicle, the charging of the energy storage device is limited to a minimum. The minimum torque is adjusted in such a way that it corresponds to the prevailing power demand of the electrical systems of the vehicle supplied by the energy storage device. Thus, although there is no further charging of the battery, discharging of the battery is reliably prevented. The charge state of the energy storage device is thus preserved and enough power is still available to restart the first drive unit, which is embodied as an internal combustion engine.

In one embodiment of the present invention, the minimum torque is adjusted in such a way that it corresponds to the prevailing power demand of the vital systems of the vehicle supplied by the energy storage device, so that the vehicle may continue to move in a manner that is actually safe during operation. These vital systems include, for example, electrical gas and brake systems, steering systems, and display systems.

The minimum torque is advantageously reduced by deactivating at least one electrical system supplied by the energy storage device. Targeted deactivation relates in particular to the comfort systems in the vehicle, including the electrical window heating systems, electrical air conditioning system, and electrical seat heating, for example. More torque is available to propel the vehicle and thus more power is available in this way.

To be able to supply the vehicle with a higher torque for a limited period of time, discharging of the energy storage device is allowed up to a predefined value. A higher torque is therefore available to the drive train for removing the vehicle from a danger area.

Another possibility for accurately calculating the minimum torque is to divide the reduced, still transferrable torque of the separating clutch between the first and second drive units in a certain proportion for each. This ensures that enough torque is available for propulsion.

In another refinement of the exemplary embodiments and/or exemplary methods of the present invention, a device for operating a vehicle having a hybrid drive, in which a first drive unit and a second drive unit contribute jointly or individually to the drive of the vehicle, the first drive unit driving the second drive unit in the manner of a generator for charging an energy storage device, and the first and the second drive units being separable by a drive train element which transfers torque of the first drive unit, and having an arrangement which reduces the torque portion used for charging the energy storage device to a minimum torque and which utilize the excess torque of the torque, which is reduced in the event of a defect in the drive train element but still exceeds the minimum torque, to propel the vehicle. Temporary propulsion of the vehicle out of a danger area or to the next repair shop is ensured with this device.

The exemplary embodiments and/or exemplary methods of the present invention allow numerous specific embodiments. One of these will now be explained in greater detail on the basis of the figures illustrated in the drawings.

BRIEF DESCRIPTION OF THE DRAWINGS

FIG. 2 shows an exemplary embodiment of the method according to the present invention.

DETAILED DESCRIPTION

Figure 1:
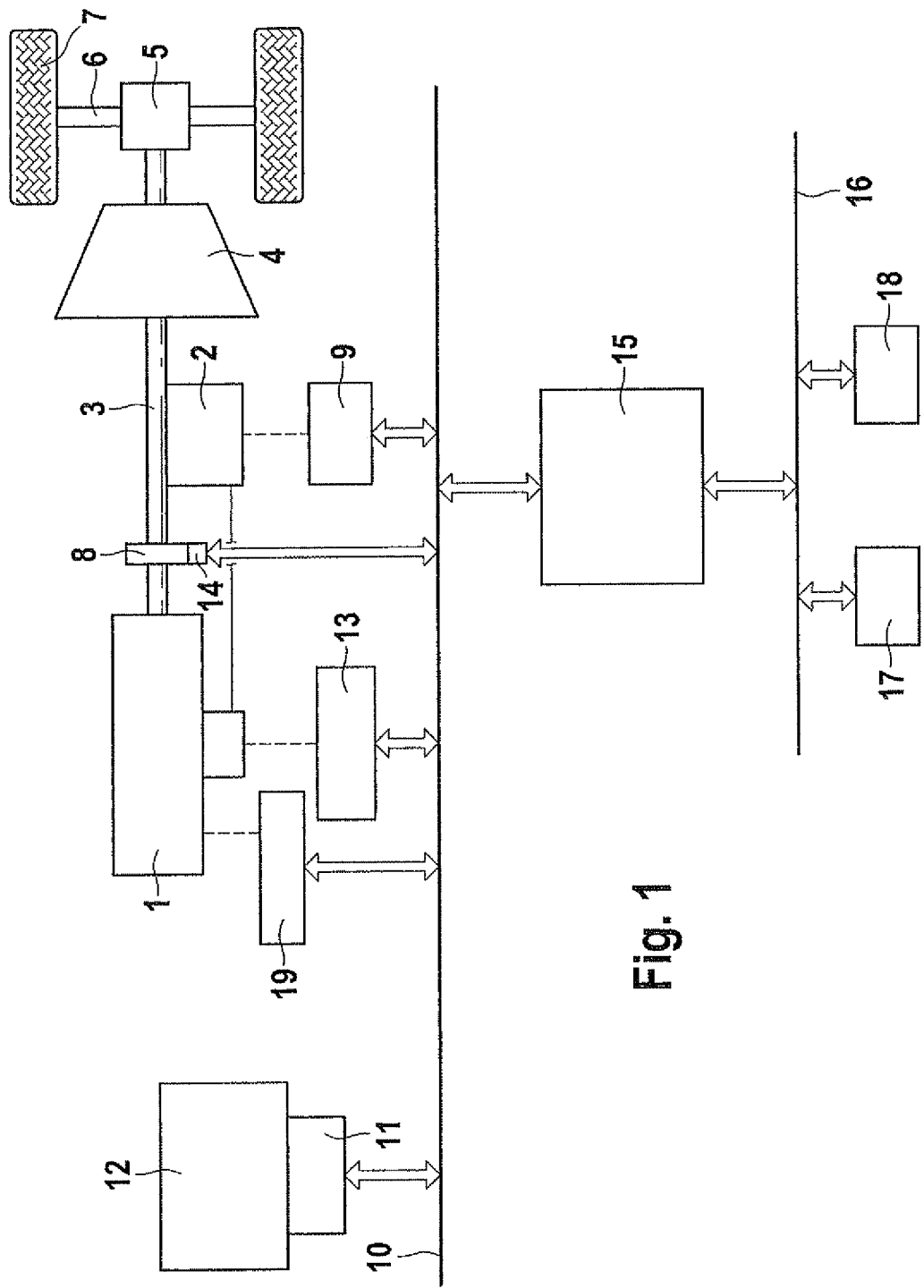
FIG. 1 shows a basic representation of a parallel hybrid.

FIG. 1 shows a parallel hybrid drive, which is formed by an internal combustion engine 1 as the first drive unit and an electric motor 2 as the second drive unit. Electric motor 2 is mounted on drive shaft 3 of internal combustion engine 1, which is connected to transmission 4, leading in turn via differential 5 on wheel axle 6 to the drive of wheel 7. Internal combustion engine 1 and electric motor 2 may be decoupled via a separating clutch 8, which is situated in drive shaft 3.

Electric motor 2 has its own electric motor control unit 9, which is connected to a hybrid CAN bus 10 via which all the control units, which have an influence on the hybrid-specific driving operation of the vehicle, communicate with one another. These include battery management system 11 of battery 12 and AC compressor 13 (alternating current compressor) and other control units, which are not shown here and control the transmission, among other things. In addition, clutch electronics 14 are also connected to hybrid CAN bus 10.

A vehicle control unit 15 communicates with the control units connected via hybrid CAN bus 10, in particular electric motor control unit 9 and battery management system 11. In addition, the vehicle control unit is connected to various control units via CAN bus 16, but only air conditioning control unit 17 and the control unit for electrical brake 18 are shown here.

An engine control unit 19 of internal combustion engine 1 is also connected to vehicle control unit 15 via hybrid CAN bus 10.

The torque of propulsion for the hybrid vehicle is controlled in vehicle control unit 15. To this end, vehicle control unit 15 analyzes the data supplied by clutch electronics 14. The relevant torque for propulsion is applied by internal combustion engine 1 as well as electric motor 2. Vehicle control unit 15 operates as a coordination unit, coordinating the contributions to the torque by internal combustion engine 1 and electric motor 2.

The prevailing charge state of battery 12 is reported by battery management system 11 to vehicle control unit 15. Battery 12 is charged when electric motor 2 is operating in generator operation, i.e., internal combustion engine 1 mechanically drives electric motor 2, which then produces electrical power, which is stored in battery 12. On the one hand, control units 15, 17, 18 of the hybrid drive are supplied with electrical power using this stored energy. On the other hand, this power also drives electric motor 2 when the latter is contributing to the propulsion of the vehicle.

FIG. 2 illustrates the case when separating clutch 8 is defective and is no longer able to transfer the maximum torque applied by internal combustion engine 1 to drive shaft 3. In this case, it is necessary to ensure that the vehicle remains ready for operation to move out of a danger situation or at least to reach the next repair shop.

In block 100, vehicle control unit 15 detects that separating clutch 14 is defective and that only a reduced torque may be applied by separating clutch 14 to drive shaft 3 to propel the vehicle. Thereupon, vehicle control unit 15 checks the charge state of battery 12 (block 101). If the charge state of the battery exceeds a predefined value, a minimum torque is defined in block 102, which is withdrawn from the reduced torque supplied by the separating clutch and is used for reliable supply of power to control units 15, 17, 18 of the vehicle. If the charge state of battery 12 is below the predefined value, the minimum torque is further reduced in block 103, so that only the control units necessary for operational safety of the vehicle, for example, control unit 18 for the electronic brake, continue to be operated. Control units, which only ensure comfort functions of the vehicle such as air conditioning control unit 17, are deactivated.

In block 104, vehicle control unit 15 checks whether the remaining torque portion of the reduced torque, which is in excess of the minimum torque, is sufficient for further operation of the vehicle. If this is not the case, then discharging of the battery to a predefined amount is made possible in block 105 to increase the contribution of the remaining torque portion, so that the vehicle is able to drive to the next repair shop.

If the reduced torque is sufficient for further operation of the vehicle, there is a switch from block 104 directly to block 106, in which the driving operation of the vehicle is detected.

The method according to the present invention may be used not only for parallel hybrids but also for all hybrid concepts having a clutch between the internal combustion engine and the drive train.

What is claimed is:

1. A method for operating a vehicle having a hybrid drive, the method comprising:
    using a first drive unit to drive a second drive unit in the manner of a generator for charging an energy storage device, in which the first drive unit and the second drive unit contribute one of jointly and individually to the drive of the vehicle, wherein the first drive unit and the second drive unit are separable by a drive train element transferring a torque of the first drive unit; and
    reducing a torque portion used for charging the energy storage device to a minimum torque; and
    using an excess torque of the torque, which is reduced in the event of a defect in the drive train element but which still exceeds the minimum torque, to propel the vehicle.

2. The method of claim 1, wherein the minimum torque is adjusted so that it corresponds to a prevailing power demand of electrical systems of the vehicle which are supplied with electrical power from the energy storage device.

3. The method of claim 2, wherein the minimum torque is adjusted so that it corresponds to the prevailing power demand of the vital systems of the vehicle which are supplied with electrical power from the energy storage device.

4. The method of claim 2, wherein the minimum torque is reduced by deactivating at least one electrical system, which is supplied with electrical power by the energy storage device.

5. The method of claim 1, wherein enough energy is withdrawn from the energy storage device for driving the vehicle, so that the energy storage device is discharged to a predefined value.

6. A device for operating a vehicle having a hybrid drive, the vehicle comprising a first drive unit and a second drive unit that contribute jointly or individually to the drive of the vehicle, the first drive unit driving the second drive unit in the manner of a generator for charging an energy storage device, and the first drive unit and the second drive unit being separable by a drive train element, which transfers a torque of the first drive unit, the device comprising:
    a reducing arrangement configured to reduce a torque portion used for charging the energy storage device to a minimum torque and to use an excess torque of the torque, which is reduced in the event of a defect in the drive train element but which still exceeds the minimum torque, so as to propel the vehicle.

7. The device of claim 6, wherein the first drive unit is an internal combustion engine, and wherein the second drive unit is an electric motor.

8. The device of claim 6, wherein the drive train element is a separating clutch for decoupling the first drive unit from the second drive unit.

* * * * *

UNITED STATES PATENT AND TRADEMARK OFFICE
CERTIFICATE OF CORRECTION

PATENT NO. : 8,712,657 B2  
APPLICATION NO. : 13/000837  
DATED : April 29, 2014  
INVENTOR(S) : Khatchikian et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 669 days.

Signed and Sealed this

Twenty-ninth Day of September, 2015

Michelle K. Lee  
*Director of the United States Patent and Trademark Office*